Sept. 8, 1953  F. T. MOSER  2,651,270
DISPENSING NOZZLE
Filed Feb. 9, 1951

INVENTOR
FRANK T. MOSER
BY Joseph M. Schofield
ATTORNEY

Patented Sept. 8, 1953

2,651,270

UNITED STATES PATENT OFFICE 2,651,270

DISPENSING NOZZLE

Frank T. Moser, Easton, Pa., assignor to Limpert Brothers, Incorporated, New York, N. Y., a corporation of New York Application February 9, 1951, Serial No. 210,153

1 Claim. (Cl. 107—14)

This invention relates to nozzles and particularly to a nozzle for dispensing small measured quantities of ice-cream in semi-frozen form from the discharge conduit of a filling machine into a shallow cup or dish.

A primary object of the invention is to discharge a measured amount of ice-cream in an annular stream successively into shallow containers or dishes so that there will be formed a central depression in the mass of ice-cream discharged and with an ornamental effect on the upper surface of the ring of ice-cream in the container surrounding the depression.

Another object of the invention is to provide a nozzle adapted for attachment to a standard filling machine for ice-cream having a solid central portion around which the ice-cream flows, there being a serrated outer periphery at the lower rim of the nozzle to permit the ice-cream to flow in an irregular manner to break up the even flow of the ice-cream and form radially extending convolutions or ripples in the surface of the ice-cream to provide an ornamental effect.

With the above and other objects in view the invention may include the features of construction and operation set forth in the following specification and illustrated in the accompanying drawing.

In the accompanying drawing annexed hereto and forming a part of this specification, I have shown the invention embodied in a single form of dispensing nozzle now preferred but it will be understood that the invention can be otherwise embodied and that the drawing is not to be construed as defining or limiting the scope of the invention, the claim appended to this specification being relied upon for that purpose.

In the above mentioned drawing there has been shown but one embodiment of the invention which is now deemed preferable, but it is to be understood that changes and modifications may be made within the scope of the appended claim without departing from the spirit of the invention.

The present described nozzle is an improvement on the sundae cup filling nozzle shown and described in my co-pending application Ser. No. 162,718 filed May 18, 1950.

Briefly, and in its preferred aspect, the invention may include the following principal parts: First, an annular flaring member having a flange at its upper end and having the lower edge serrated and with some of the serrations curved inwardly; second, a solid central portion or member supported within the annular member, the lower portion being flared outwardly; and third, the supporting and spacing members for the central member being tubular and intersecting openings extending from the lower surface of the central member to the outside surface of the nozzle.

Figure 1:
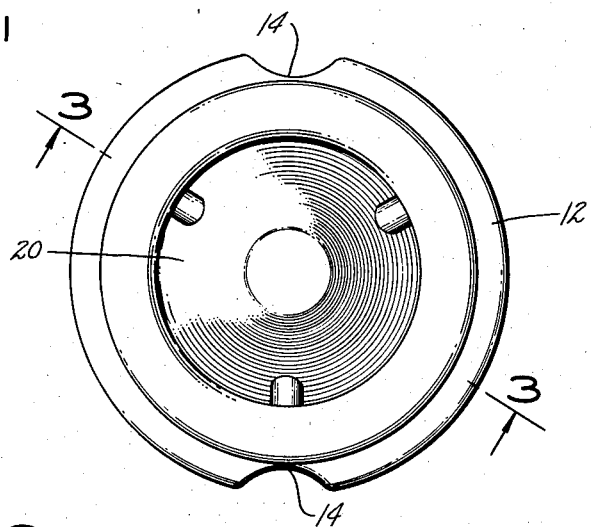
Fig. 1 is a plan view of a nozzle made according to the present invention.
Figure 2:
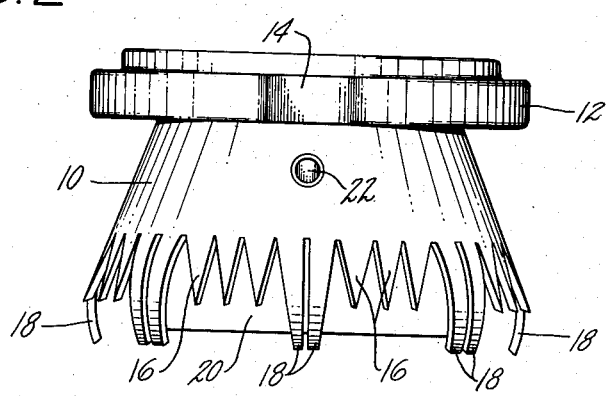
Fig. 2 is a side elevation of the nozzle shown in Fig. 1.
Figure 3:
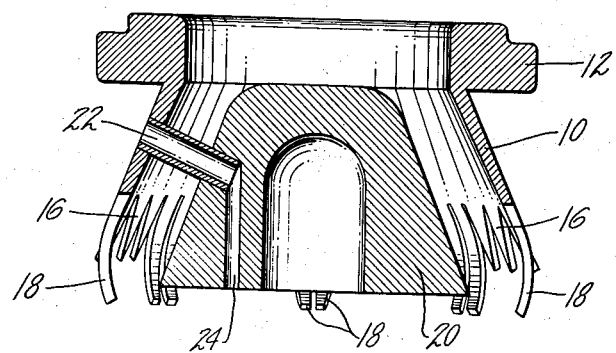
Fig. 3 is a central sectional view taken on the plane of line 3—3 in Fig. 1.

Referring more in detail to the figures of the drawing and first to Fig. 3 it will be seen that the nozzle comprises two principal component parts or members. The outer or annular member 10 has at its upper end a large and heavy flange 12 recessed as shown at 14 for attachment to the downwardly extending dispensing conduit of an ice-cream filling machine. A large central opening at the top through the flange 12 increases in diameter downwardly and the wall of the outer member is thin but solid for a portion of its length. The lower portion of the thin skirted portion of the outer member is serrated as shown at 16 and 18. Preferably and as shown in Figs. 2 and 3 the serrations 16 are not of uniform depth but are of two series alternating in size and height. In the example illustrated the shorter serrations 16 are in groups of three interposed by two longer and closely spaced serrations 18. The longer serrations have their lower ends inwardly curved.

Centrally supported within the outer or annular member 10 is a solid central member 30 the upper surface of which is domed to provide a free flowing surface for the ice-cream. The lower portions of this central member flare outwardly and provide an annular opening within the outer or annular member 10 increasing in diameter downward.

To support this central member 20 connecting tubes 22 are provided as best shown in Fig. 3 the opposite ends of these tubes extending respectively into the central member 20 and annular member 10. The inner ends of the tubes 22 intercept openings 24 extending from the lowermost surface so that there are continuous openings from the space within the annular discharge opening of the nozzle and the outer surface of the nozzle.

From the above description it will be seen that semi-solid ice-cream flowing downward through the annular flaring opening of the nozzle will spread on the bottom surface of a shallow container around the center of the container or dish. A central depression will be formed immediately, below the central member where no flow exists, and in spreading radially through the serrated lower rim of the annular member will form an irregular rippled surface on the upper surface of the ice-cream. As the flow of ice-cream from the nozzle is substantially radially outward around the periphery of the nozzle the convolutions or ripples will extend generally radially and form an irregular pattern to provide a decorative effect on the surface of the ice cream.

The particular nozzle shown and described in this application is for forming the ice-cream in the confection shown in my co-pending application D. 13,837 filed January 17, 1951, for a design for an Ice Cream Confection. The ice-cream is deposited in the shallow cup in annular form surrounding a central depression for syrup. The upper surface of the ice-cream is irregular and has undulations extending generally radially by portions of the ice-cream being discharged through the serrations formed on the discharge periphery of the annular member of the nozzle.

By means of a second nozzle of standard form, topping or syrup may be admitted to the central depression to complete the formation of the confection.

I claim as my invention:

A nozzle for an ice-cream filling machine comprising a flaring annular member attached to the discharge conduit of the filling machine, the lower periphery of said annular member being serrated about its periphery, a central member having holes extending upwardly from the lowermost surface thereof and a flaring outer surface, said central member being supported from said annular member and in fixed position therein, the supporting members for said central member comprising tubes extending through the wall of said annular member and entering said central member in positions to communicate with the holes extending from the lowermost surface of said central member.

FRANK T. MOSER.

References Cited in the file of this patent

UNITED STATES PATENTS

| Number | Name | Date |
|---|---|---|
| 66,320 | Goodrich | July 2, 1867 |
| 560,719 | Hueg | May 26, 1896 |
| 573,432 | Megson | Dec. 15, 1896 |
| 827,306 | Herisse | July 31, 1906 |
| 861,076 | Baum | July 23, 1907 |
| 1,397,510 | Grassi | Nov. 22, 1921 |
| 1,465,749 | Westerman | Aug. 21, 1923 |
| 1,500,754 | Howard | July 8, 1924 |
| 1,677,808 | Alassio | July 17, 1928 |